April 23, 1957   J. FRANSEN ET AL   2,790,085
DEVICE FOR MAKING PHOTOGRAPHS OF X-RAY IMAGES BY
MEANS OF AN IMAGE AMPLIFIER
Filed July 19, 1954
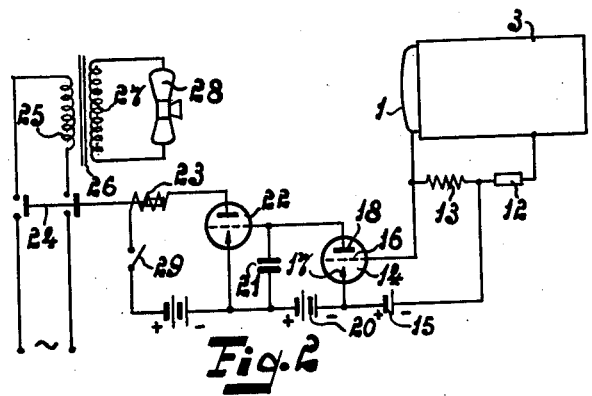
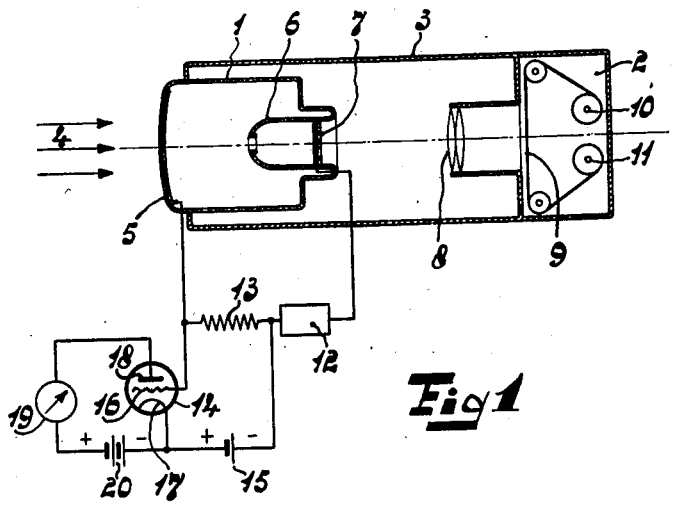
INVENTORS
JACOBUS FRANSEN
MARTEN CORNELIS TEVES
TAEKE TOL
BY
AGENT

# United States Patent Office 2,790,085
Patented Apr. 23, 1957

2,790,085

DEVICE FOR MAKING PHOTOGRAPHS OF X-RAY IMAGES BY MEANS OF AN IMAGE AMPLIFIER

Jacobus Fransen, Marten Cornelis Teves, and Taeke Tol, Eindhoven, Netherlands, assignors, by mesne assignments, to North American Philips Company, Inc., New York, N. Y., a corporation of Delaware Application July 19, 1954, Serial No. 444,258

Claims priority, application Netherlands July 17, 1953

3 Claims. (Cl. 250—65)

The present invention relates to apparatus for making cinematograph photographs. More particularly, the invention relates to apparatus for making cinematograph photographs of X-ray images.

The process of making radiographs in quick succession is of great assistance in X-ray examination. Due to the development of the image amplifier a number of difficulties which restrained X-ray cinematography, have been removed. By means of this apparatus the invisible X-ray image is converted into an optical image and this in turn is converted into an electron image which is focussed on a fluorescent screen. The use of a high accelerating voltage for the electrons and electron optical reduction of the electron image permit the brightness of the fluorescent image to be increased approximately 1000 times compared with what would be shown on a normal fluorescent screen if the image amplifier and the fluorescent screen are exposed to X-rays of the same intensity. This intensified brightness permits photographs to be made of the X-ray image in the short exposure time involved in cinematography.

It is known to combine in a device used in X-ray examination an image amplifier with a cinematograph camera. In order to ascertain the brightness of the fluorescent image which acts as an object for the photograph one may start with the fact that the exposure time is determined by the number of pictures made per second. It is the same for each exposure, and consequently it is desirable that the mean brightness of the fluorescent image does not vary excessively, in order to avoid wide differences of the mean blackening of the pictures. As an alternative, one may rely upon the principle, known and used in the art of radiography, that an exposure is automatically terminated after a predetermined blackening of the photographic plate has been obtained. In cinematography the photographs must in this case be made within the available exposure time.

In order to realize these possibilities in a radiography device comprising the combination of an image amplifier and a camera, and in accordance with the present invention, a control quantity is derived from the photo-cathode current of the image amplifier and used as a measure of the mean blackening of the photographic film. The control quantity may be derived from the indication of a measuring instrument, a given position of the pointer of which corresponds to the desired image brightness which produces correct blackening in the exposure time measured by the camera. In addition, the obtained control quantity may be used to operate a control device for interrupting the tube load after the film has been sufficiently exposed for the desired blackening to be produced.

In order that the invention may be more readily carried into effect it will now be described with reference to the accompanying drawing, wherein:

Fig. 1 is a schematic diagram of an embodiment of apparatus according to the present invention; and Fig. 2 is a schematic diagram of a control circuit for energizing and deenergizing the X-ray tube of the apparatus according to the invention.

The combination of an image amplifier 1 and a camera 2 is enclosed in a light-proof envelope 3. A description in detail of the two parts constituting the combination will be omitted, since for this purpose apparatus of known type may be used.

The X-ray image produced by the X-rays 4 is converted in the input screen 5 of the image amplifier 1 to an optical image. The optical image is converted to an electron image and focussed electron-optically by means of an electric field set up between the input screen 5 and the anode 6 on the fluorescent screen 7. On the screen 7, a reduced and intensified reproduction of the X-ray image is produced in fluorescent light. By means of the optical lens combination 8 the image of the fluorescent screen 7 is photographed on the film tape 9. The camera 2 contains two reels 10 and 11 of which one contains the used part of the film and the other the film not yet used. The camera 2 is assumed to comprise, as is usual in cinematography, a member which periodically interrupts the path of the light between the fluorescent screen 7 and the film 9 and also a driving mechanism to move the film along the distance of a picture frame during the time in which the light is shut off.

The anode 6 of the image amplifier 1 is connected to the positive terminal of a voltage source 12 the negative terminal of which is connected via a resistor 13 to the input screen 5. Thus, the accelerating voltage for moving the electrons from the input screen 5 to the fluorescent screen 7, which is connected electrically to the anode 6, is maintained, the electric current produced by the electron drift passing through the resistor 13. The potential difference set up across the resistor 13 is used as a control voltage in the grid circuit of a discharge tube 14. The grid circuit of the tube 14 also includes a direct current supply source 15, the positive terminal of which is connected to the cathode 17 of said tube 14, the negative terminal being connected to one end of the resistor 13. The voltage set up at the resistor 13 increases the potential of a grid 16 of the discharge tube 14 from a negative value with respect to the cathode 17. The discharge current flowing through the tube 14 in this case is sent from the anode 18 through the measuring instrument 19 and via the anode voltage supply source 20 to the cathode 17. The magnitude of this current is substantially determined by the grid potential, with the result that this indicates the magnitude of the current passed by the resistor 13. The mean brightness of the illuminated fluorescent screen 7 increases with increase of this current. Consequently the deflection of the meter 19 shows whether the brightness of this screen differs from a given value which permits satisfactory cinematograph photographs to be made. Differences in brightness which may occur can be corrected by varying the load imposed on the X-ray tube. The deflection of the meter 19 indicates in which sense the load is to be varied for correcting for brightness differences.

When photographs are made according to the principle that the product of luminous intensity and exposure time is indicated as a measurable value, use may be also made of the current passed by the resistor 13. For this purpose the measuring instrument 19 included in the anode circuit of the discharge tube 14 is replaced by a capacitor 21 as shown in Fig. 2. The capacitor 21 is charged by the anode current of the discharge tube 14, the voltage set up at the terminals being proportional to the product of the current flowing through the resistor 13 and the time of exposure. The voltage across the capacitor 21 is used as a control voltage for a discharge tube 22. The anode current of the tube 22 flows through the relay coil 23 which operates the switch 24 corrected in the primary circuit 25 of the supply transformer 26. The secondary winding 27 of the supply transformer 26 is connected to the X-ray tube 28. Upon closure of the hand operated switch 29 in the anode circuit of the discharge tube 22, the exposure starts due to the anode current actuating the relay 24 and after the correct exposure time has elapsed the exposure is automatically terminated.

When a series of photographs are made in succession with the use of an exposure time ascertained in the last-mentioned manner, it is also possible for control members controlling the film driving mechanism of the camera to be coupled to the relay 24 in order to initiate the sequence of movements required to replace the exposed picture frame by a new one on termination of each successive exposure. As soon as this has occurred, the X-ray apparatus may again be switched on for the next exposure. This arrangement has not been illustrated more fully in the drawing because an operable switching system in accordance therewith would be obvious to one skilled in the art.

Instead of a lens camera, use may also be made of a mirror camera. Such a camera may also be adapted to cinematography.

While the invention has been described by means of specific examples and in specific embodiments, we do not wish to be limited thereto, for obvious modifications will occur to those skilled in the art without departing from the spirit and scope of the invention.

What is claimed is:

1. Apparatus for making cinematograph photographs comprising an image amplifier for converting an X-ray image into a light image including a photo-cathode and an anode, a source of potential coupled to said cathode and anode, a camera including film optically coupled to said image amplifier for photographing said light image produced thereby, and means coupled to said source and responsive to the current flow between said cathode and anode for controlling the correct exposure of said film.

2. Apparatus as claimed in claim 1 wherein the last-named means includes a current-measuring instrument for indicating the mean brightness of the light image.

3. Apparatus as claimed in claim 1 wherein the last-named means includes a capacitor arranged to be charged by said anode-cathode current, and means responsive to the voltage across said capacitor to termniate the X-ray image to thereby stop further exposure of the film.

References Cited in the file of this patent
UNITED STATES PATENTS

| | | |
|---|---|---|
| 2,523,132 | Mason et al. | Sept. 19, 1950 |
| 2,525,832 | Sheldon | Oct. 17, 1950 |
| 2,561,085 | Zavales et al. | July 17, 1951 |
| 2,595,430 | Tuttle et al. | May 6, 1952 |